(12) United States Patent
Yoshitani et al.

(10) Patent No.: US 11,555,683 B2
(45) Date of Patent: Jan. 17, 2023

(54) FORM MEASURING INSTRUMENT AND METHOD OF DETECTING ABNORMALITY

(71) Applicant: MITUTOYO CORPORATION, Kanagawa (JP)

(72) Inventors: Satoshi Yoshitani, Tokyo (JP); Tomoyuki Miyazaki, Kanagawa (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 17/508,106

(22) Filed: Oct. 22, 2021

(65) Prior Publication Data
US 2022/0146246 A1 May 12, 2022

(30) Foreign Application Priority Data
Nov. 6, 2020 (JP) .............................. JP2020-185676

(51) Int. Cl.
*G01B 5/012* (2006.01)
*G01B 5/20* (2006.01)

(52) U.S. Cl.
CPC ............... *G01B 5/012* (2013.01); *G01B 5/20* (2013.01)

(58) Field of Classification Search
CPC .................................................. G01B 12/012
USPC ........................................................ 33/503
See application file for complete search history.

(56) References Cited

U.S. PATENT DOCUMENTS

| | | | | |
|---|---|---|---|---|
| 5,594,668 A * | 1/1997 | Bernhardt | ............ | G01B 21/045 700/193 |
| 7,086,170 B2 * | 8/2006 | Hajdukiewicz | ........ | G01B 5/012 33/558 |
| 7,316,076 B2 * | 1/2008 | Ruijl | ...................... | G01B 5/016 33/561 |
| 7,392,692 B2 * | 7/2008 | Noda | ..................... | G01B 5/008 73/104 |
| 7,797,850 B2 * | 9/2010 | Hon | ........................ | G01B 7/012 33/559 |
| 7,882,644 B2 * | 2/2011 | Kawabata | ............... | G01B 7/012 33/559 |
| 7,900,367 B2 * | 3/2011 | Sutherland | ........... | G01B 21/042 33/502 |
| 7,918,033 B2 * | 4/2011 | Held | .................... | G01B 21/042 33/502 |
| 9,316,473 B2 * | 4/2016 | Jensen | ................... | G01B 5/012 |
| 9,366,519 B2 * | 6/2016 | Danbury | ................ | G01B 5/008 |

(Continued)

FOREIGN PATENT DOCUMENTS

JP 2007-279012 A 10/2007

*Primary Examiner* — George B Bennett
(74) *Attorney, Agent, or Firm* — Greenblum & Bernstein, P.L.C.

(57) ABSTRACT

A form measuring instrument includes: a contact tip configured to contact with a workpiece; a movement mechanism configured to cause relative movement of the contact tip with respect to the workpiece; a movement controlling unit configured to control the movement mechanism; a contact sensor configured to detect a contact amount of the contact tip with the workpiece and output a detection signal corresponding to the contact amount; and an abnormality determining unit configured to determine an abnormality of sensitivity of the contact sensor based on a change in the detection signal outputted from the contact sensor during an operation of the movement mechanism in which the contact tip is pressed against the workpiece.

6 Claims, 6 Drawing Sheets

(56) References Cited

U.S. PATENT DOCUMENTS

| | | | |
|---|---|---|---|
| 9,383,198 B2 * | 7/2016 | Sagemueller | G01B 21/045 |
| 9,618,312 B2 * | 4/2017 | Shimaoka | G01B 5/012 |
| 9,726,481 B2 * | 8/2017 | McMurtry | G01B 7/008 |
| 9,726,482 B2 * | 8/2017 | Iseli | G01B 21/047 |
| 2019/0145764 A1 * | 5/2019 | Atherton | G01B 21/047 33/503 |
| 2021/0116228 A1 * | 4/2021 | Hamner | G01B 5/012 |

* cited by examiner

FORM MEASURING INSTRUMENT AND METHOD OF DETECTING ABNORMALITY

The entire disclosure of Japanese Patent Application No. 2020-185676 filed Nov. 6, 2020 is expressly incorporated by reference herein.

TECHNICAL FIELD

The present invention relates to a contact-type form measuring instrument and a method of detecting an abnormality of a contact sensor in the form measuring instrument.

BACKGROUND ART

Conventionally, a contact-type form measuring instrument for measuring a shape, a dimension and the like of an object to be measured is known (for instance, Patent Literature 1: JP 2007-279012 A). This form measuring instrument: includes a contact tip configured to contact with an object to be measured and a contact sensor for detecting a contact amount (for instance, a pressing force or a pressed amount) of the contact tip with the object to be measured; and measures the object to be measured while controlling a contact state of the contact tip with the object to be measured based on the contact amount detected by the contact sensor.

However, due to some abnormalities occurring at, for instance, the contact tip or the contact sensor, sensitivity of the contact sensor may reduce. In this case, it is likely that the contact state of the contact tip with the object to be measured cannot be properly controlled to make the contact tip strongly contact with the object to be measured, thereby damaging the contact tip and the contact sensor.

SUMMARY OF THE INVENTION

An object of the invention is to provide a form measuring instrument configured to detect an abnormality of sensitivity of a contact sensor and a method of detecting an abnormality.

A form measuring instrument according to an aspect of the invention includes: a contact tip configured to contact with an object to be measured; a movement mechanism configured to cause relative movement of the contact tip with respect to the object to be measured; a movement controlling unit configured to control the movement mechanism; a contact sensor configured to detect a contact amount of the contact tip with the object to be measured and output a detection signal corresponding to the contact amount; and an abnormality determining unit configured to determine an abnormality of sensitivity of the contact sensor based on a change in the detection signal outputted from the contact sensor during an operation of the movement mechanism in which the contact tip is pressed against the object to be measured.

In the form measuring instrument with the above arrangement, when the sensitivity of the contact sensor is abnormal, the change in the detection signal outputted from the contact sensor during the operation of the movement mechanism in which the contact tip is pressed against the object to be measured is smaller than that for the normal sensitivity. Accordingly, the abnormality determining unit can determine the abnormality of the sensitivity of the contact sensor by performing operations such as monitoring the change in the detection signal outputted from the contact sensor during the operation of the movement mechanism and comparing this change with the change for the normal sensitivity.

In the form measuring instrument with the above arrangement, the abnormality of the sensitivity of the contact sensor can be detected before the contact tip or the contact sensor is damaged.

It should be noted that the contact amount of the contact tip with the object to be measured may represent a degree of contact of the contact tip with the object to be measured, such as a pressing force or a pressed amount of the contact tip with the object to be measured and a stress applied to the contact tip.

In the form measuring instrument with the above arrangement, the abnormality determining unit may compare a change amount of the detection signal for a predetermined time with a predetermined threshold to determine the abnormality of the sensitivity of the contact sensor.

Alternatively, in the form measuring instrument with the above arrangement, the abnormality determining unit may compare a required time for a predetermined change amount of the detection signal with a predetermined threshold to determine the abnormality of the sensitivity of the contact sensor.

With the above arrangement, the abnormality of the sensitivity of the contact sensor can be suitably detected.

In the form measuring instrument with the above arrangement, it is preferable that the abnormality determining unit uses the threshold that is different depending on a relative movement speed of the contact tip being pressed against the object to be measured.

In other words, in the form measuring instrument with the above arrangement, the change in the detection signal outputted from the contact sensor during the operation of the movement mechanism in which the contact tip is pressed against the object to be measured is different depending on the relative movement speed of the contact tip determined at the movement mechanism. Accordingly, the abnormality determining unit can more accurately detect the abnormality of the sensitivity of the contact sensor by determining the abnormality using the threshold suitable for the relative movement speed of the contact tip.

In the form measuring instrument with the above arrangement, it is preferable that the movement controlling unit stops the operation of the movement mechanism in response to a determination by the abnormality determining unit that the sensitivity of the contact sensor is abnormal.

With the above arrangement, the contact tip can be prevented from strongly contacting with the object to be measured during measuring the object to be measured. As a result, the contact tip and the contact sensor can be prevented from being damaged.

A method of detecting an abnormality according to another aspect of the invention, which is used in a form measuring instrument including a contact tip configured to contact with an object to be measured, and a contact sensor configured to detect a contact amount of the contact tip with the object to be measured and output a detection signal corresponding to the contact amount, includes: contacting by pressing the contact tip against the object to be measured; and determining the abnormality of sensitivity of the contact sensor based on a change in the detection signal outputted from the contact sensor during the contacting.

According to the above method of detecting the abnormality, a similar effect to the above effect of the form measuring instrument can be attained.

BRIEF DESCRIPTION OF DRAWING(S)

DESCRIPTION OF EMBODIMENT(S)

An exemplary embodiment of the invention will be described with reference to attached drawings.

Figure 1:
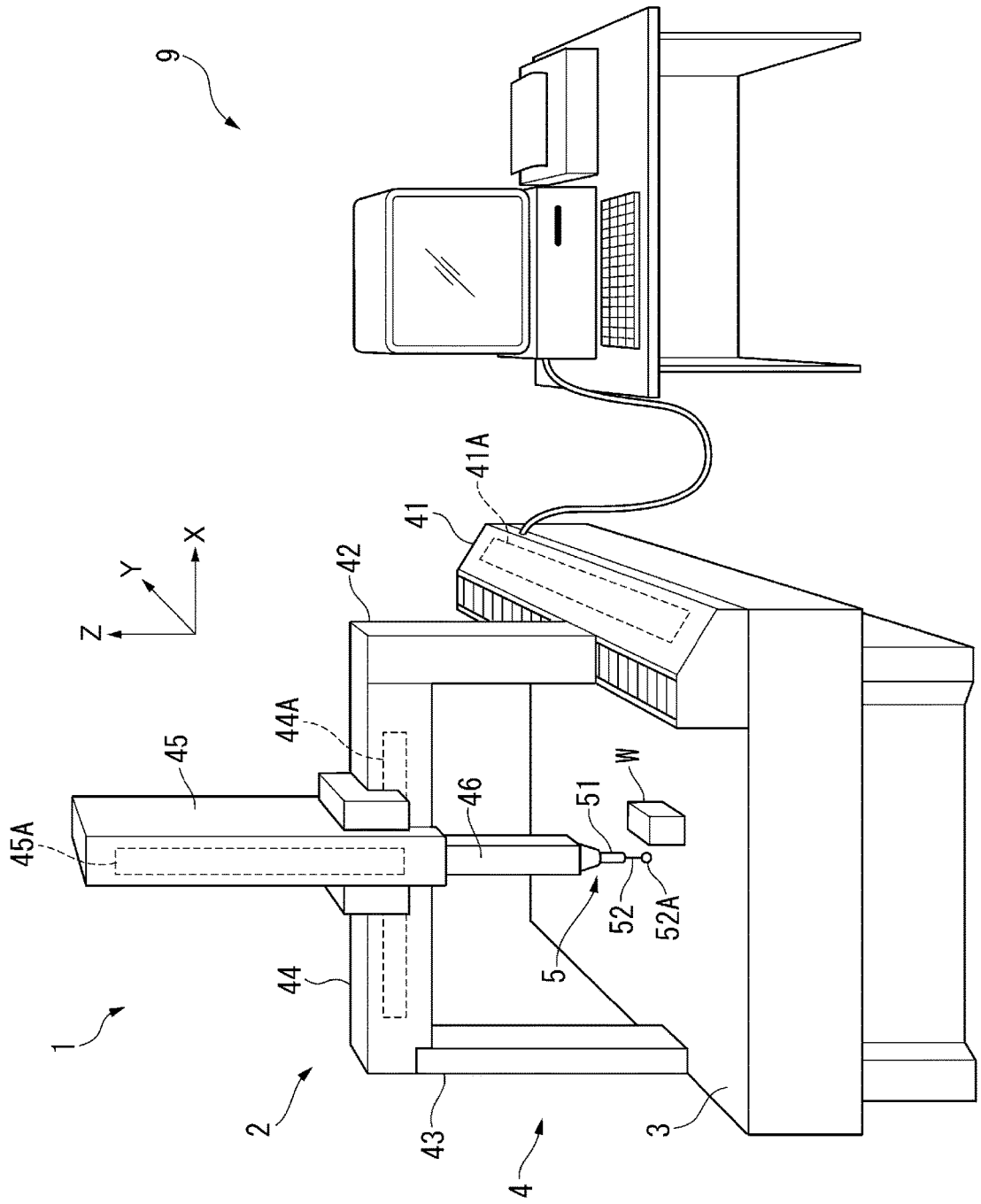
FIG. 1 is a perspective view showing a form measuring instrument according to an exemplary embodiment of the invention.

As shown in FIG. 1, a form measuring instrument 1 according to the exemplary embodiment, which is a coordinate measuring machine for measuring a shape and the like of a workpiece W, includes: a measuring machine body 2 on which the workpiece W is placed; and a control device 9 for performing operations such as controlling the measuring machine body 2 and analyzing measurement results.
Structure of Measuring Machine Body 2

As shown in FIG. 1, the measuring machine body 2 includes: a movement mechanism 4 disposed on a stage 3; a probe 5 movable in three axial directions (i.e., an X-axis direction, Y-axis direction and Z-axis direction) by means of the movement mechanism 4; and a controller 7 (see FIG. 2) provided, for instance, inside the measuring machine body 2.

The workpiece W, which is an object to be measured, is placed on the stage 3.

The movement mechanism 4, which is configured to move the probe 5, includes a guide 41, a column 42, a support 43, a beam 44, an X-slider 45 and a Z-slider 46.

The guide 41 is provided to the stage 3 on a +X side of the stage 3 and along the Y-axis direction. The column 42 is provided to the guide 41 to be slidable in the Y-axis direction. The support 43 is provided to the stage 3 on a −X side of the stage 3 by an air bearing or the like. The beam 44 extends between the column 42 and the support 43 along the X direction. The X-slider 45, which is formed in a cylinder extending along the Z-axis direction, is provided to be slidable on the beam 44 along the X-axis direction. The Z-slider 46 is provided to be slidable inside the X-slider 45 along the Z-axis direction. The probe 5 is fixed at a tip of the Z-slider 46.

In addition, the movement mechanism 4 includes: a Y-axis drive unit 41A for driving the column 42 in the Y-axis direction; an X-axis drive unit 44A for driving the X-slider 45 in the X-axis direction; and a Z-axis drive unit 45A for driving the Z-slider 46 in the Z-axis direction. The Y-axis drive unit 41A, the X-axis drive unit 44A and the Z-axis drive unit 45A each include: a driving source (not shown); and a drive transmission mechanism for transmitting a driving force supplied from the driving source.

Moreover, the movement mechanism 4 is provided with a coordinate detecting mechanism 48 (see FIG. 2) for detecting positions of the column 42, the X-slider 45 and the Z-slider 46 in the respective axis directions, i.e., a coordinate of the probe 5 on the stage 3.

For instance, the coordinate detecting mechanism 48 is a mechanism including a Y-axis scale sensor provided to the column 42, an X-axis scale sensor provided to the X-slider 45 and a Z-axis scale sensor provided to the Z-slider 46, and outputs scale signals Sx, Sy, Sz from the respective sensors.

As shown in FIG. 1, the probe 5 includes: a probe body 51 held by the movement mechanism 4; and a stylus 52 detachably attached to the probe body 51. A tip of the stylus 52 is provided with a contact tip 52A, for instance, in a form of a sphere.

Furthermore, the probe 5 is provided with a sensor body 61 (see FIG. 2) of a contact sensor 6 for detecting a contact amount of the contact tip 52A with the workpiece W.

The contact sensor 6 according to the exemplary embodiment is a so-called vibrating sensor, which detects a contact amount (specifically, a pressing force) of the contact tip 52A with the workpiece W by vibrating the stylus 52 and detecting the vibration of the stylus 52.

Figure 2:
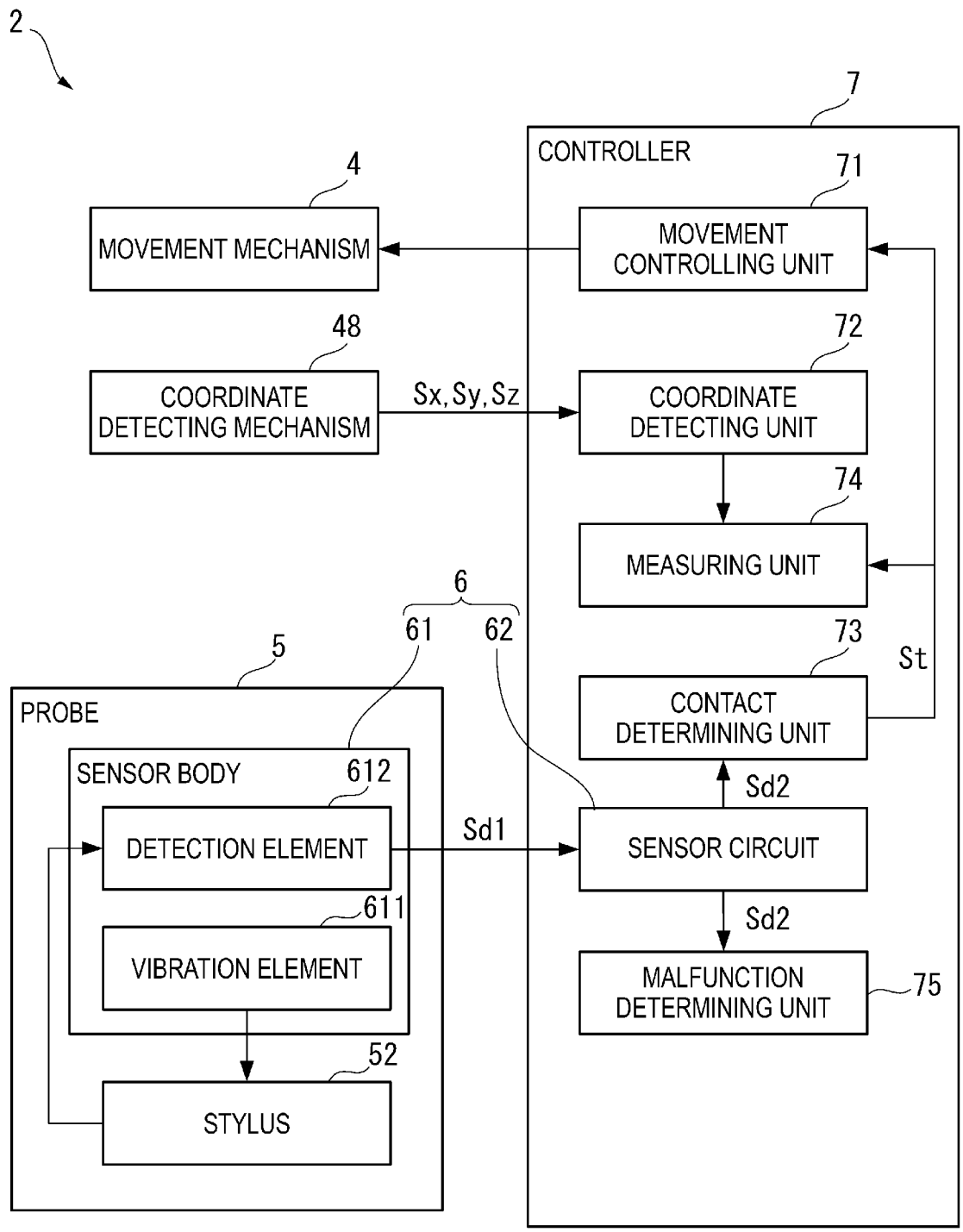
FIG. 2 is a block diagram schematically showing a structure of a measuring machine body according to the exemplary embodiment.

Specifically, as shown in FIG. 2, the contact sensor 6 according to the exemplary embodiment includes: the sensor body 61 provided to the probe 5; and a sensor circuit 62 for processing a signal outputted from the sensor body 61. It should be noted that the sensor circuit 62 according to the exemplary embodiment is provided in the controller 7.

The sensor body 61 includes a vibration element 611 and a detection element 612. The vibration element 611 and the detection element 612 are each provided, for instance, in a form of a piezoelectric element.

The vibration element 611 receives an excitation signal from an oscillator (not shown) to be excited in a resonant state, thereby vibrating the stylus 52.

The detection element 612 detects the vibration of the stylus 52 and outputs a vibration signal Sd1 including a vibration waveform component corresponding to a vibration state of the stylus 52.

The sensor circuit 62 includes, for instance, an amplitude extraction circuit. The sensor circuit 62 measures an amplitude of the vibration signal Sd1 inputted from the sensor body 61 and outputs a detection signal Sd2 having an output value V corresponding to the amplitude of the vibration signal Sd1.

Here, when the contact tip 52A has contacted with the workpiece W, the vibration of the stylus 52 is restrained by the workpiece W and the amplitude of the vibration signal Sd1 outputted from the detection element 612 attenuates according to the pressing force of the contact tip 52A against the workpiece W. Specifically, as the pressing force of the contact tip 52A against the workpiece W increases, the amplitude of the vibration signal Sd1 greatly attenuates. Accordingly, as the pressing force of the contact tip 52A against the workpiece W increases, an output value V of the detection signal Sd2 outputted from the sensor circuit 62 decreases.

In other words, the contact sensor 6 according to the exemplary embodiment outputs the detection signal Sd2 corresponding to the contact amount (pressing force) of the contact tip 52A with the workpiece W.

It should be noted that in the exemplary embodiment, an example of the structure of the contact sensor 6 detecting contact in any one direction (e.g., the X-axis direction) of the X, Y, Z-axis directions for simplifying the description. However, the contact sensor 6 may have a structure configured to detect the contact in the respective X, Y, Z-axis directions.

The controller 7 includes a movement controlling unit 71, a coordinate detecting unit 72, a contact determining unit 73, a measuring unit 74 and an abnormality determining unit 75, in addition to the above sensor circuit 62.

The movement controlling unit 71 controls an operation of the movement mechanism 4 according to, for instance, a measurement instruction inputted from the control device 9. For instance, in touch measurement of the workpiece W, the movement controlling unit 71 controls the operation of the movement mechanism 4 such that the contact tip 52A is brought into contact with the workpiece W at measurement points set in a measurement path. Here, in bringing the contact tip 52A into contact with the workpiece W, the movement controlling unit 71 presses the contact tip 52A into the workpiece W until a touch signal St is inputted from the contact determining unit 73 described later.

The coordinate detecting unit 72 detects the coordinate of the probe 5 by counting the scale signals Sx, Sy, Sz inputted from the coordinate detecting mechanism 48.

The contact determining unit 73 determines whether the contact tip 52A has appropriately contacted with the workpiece W based on the detection signal Sd2 inputted from the sensor circuit 62. For instance, the contact determining unit 73 compares the output value V of the detection signal Sd2 with a predetermined target value Vt, and outputs the touch signal St representing that the contact tip 52A has contacted with the workpiece W while the output value V of the detection signal Sd2 is smaller than or equal to the target value Vt.

Each time the touch signal St is inputted from the contact determining unit 73, the measuring unit 74 imports the coordinate of the probe 5 detected by the coordinate detecting unit 72 and outputs the coordinate to the control device 9 as a measured value.

The abnormality determining unit 75 determines presence or absence of an abnormality of sensitivity of the contact sensor 6 based on the detection signal Sd2 inputted from the sensor circuit 62.

It should be noted that the abnormality determining unit 75 may be provided in a form of hardware such as an IC. Alternatively, in a computer including a CPU, the CPU may execute a program stored in a memory, thereby providing the abnormality determining unit 75.

Method of Determining Abnormality

A method of detecting an abnormality in the form measuring instrument 1 according to the exemplary embodiment will be described.

It should be noted that the touch measurement of the workpiece W at any measurement points will be described below.

First, the operation of the movement mechanism 4 controlled by the movement controlling unit 71 moves the probe 5 toward the workpiece W to press the contact tip 52A against the workpiece W (a contact step).

Figure 3:
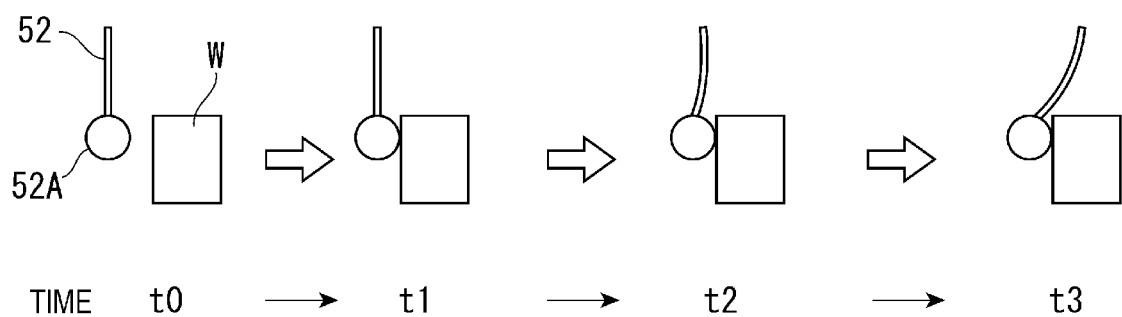
FIG. 3 is an illustration schematically showing how a contact tip is pressed against an object to be measured.
Figure 4:
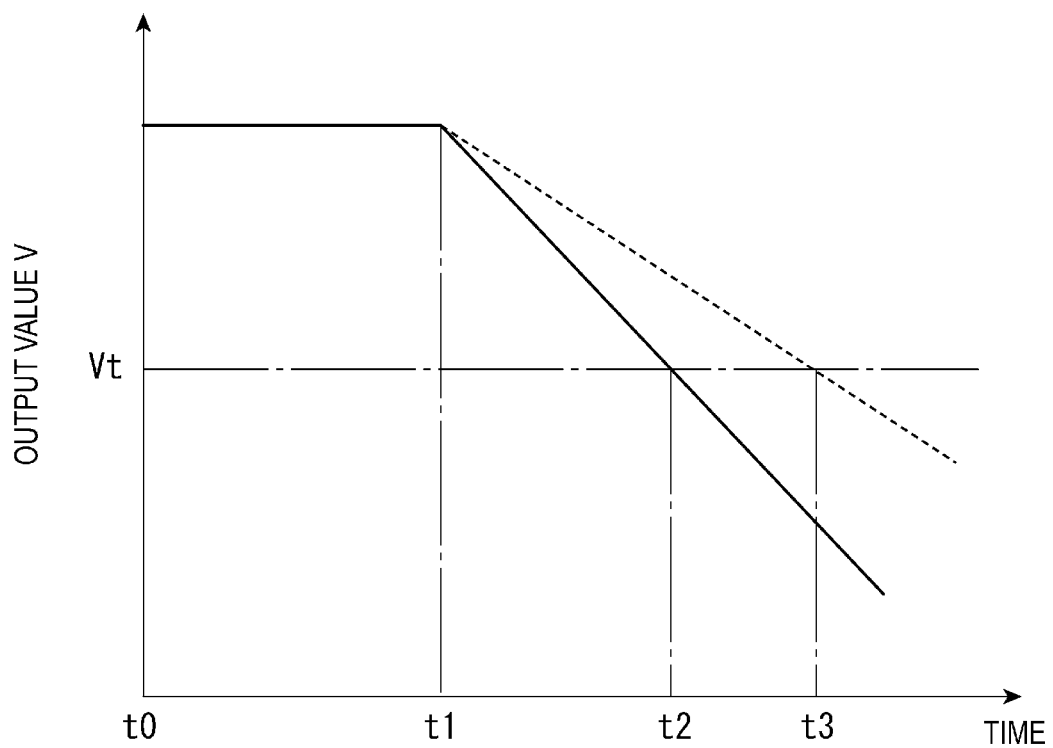
FIG. 4 is a graph showing a change in a detection signal outputted from a contact sensor according to the exemplary embodiment.

Here, FIG. 3 schematically shows a change in a contact state when shifting from a state where the contact tip 52A is in non-contact with the workpiece W to a state where the contact tip 52A is excessively pressed against the workpiece W. FIG. 4 shows a change in the output value V of the detection signal Sd2 corresponding to each state shown in FIG. 3. In addition, in FIG. 4, a solid line shows the output value V of the detection signal Sd2 when the sensitivity of the contact sensor 6 is normal, and a dotted line shows the output value V of the detection signal Sd2 when the sensitivity of the contact sensor 6 is abnormal.

As shown in FIGS. 3 and 4, the contact tip 52A is in a non-contact state with the workpiece W at time t0 and the contact tip 52A initiates to contact with the workpiece W at time t1. Subsequently, the contact tip 52A is further pressed against the workpiece W, so that the output value V of the detection signal Sd2 gradually decreases.

When the sensitivity of the contact sensor 6 is normal, at time t2, the contact tip 52A contacts with the workpiece W at an appropriate pressing force, so that the output value V of the detection signal Sd2 reaches the target value Vt. At this time, the contact determining unit 73 initiates to output the touch signal St representing that the contact tip 52A has contacted with the workpiece W. The measuring unit 74 into which the touch signal St is inputted imports the coordinate of the contact tip 52A detected by the coordinate detecting mechanism 48 and outputs the coordinate to the control device 9 as a measured value. Moreover, the movement controlling unit 71 into which the touch signal St is inputted stops movement of the probe 5 toward the workpiece W by controlling the movement mechanism 4. In other words, the movement controlling unit 71 stops pressing the contact tip 52A against the workpiece W.

On the other hand, when the sensitivity of the contact sensor 6 is abnormal, an inclination of the change in the detection signal Sd2 while the contact tip 52A is kept pressed against the workpiece W is smaller than that when the sensitivity of the contact sensor 6 is normal. Accordingly, even when the contact tip 52A has contacted with the workpiece W at an appropriate pressing force at time t2, the output value V of the detection signal Sd2 does not reach the target value Vt.

In such a case, in a typical technique, the movement of the probe 5 toward the workpiece W continues even after time t2. Furthermore, at time t3 subsequent to time t2, the detection signal Sd2 reaches the target value Vt but the contact tip 52A is excessively strongly pressed against the workpiece W.

Accordingly, in the exemplary embodiment, the abnormality determining unit 75 monitors the change in the output value V of the detection signal Sd2 during the contact step and determines presence or absence of the abnormality of the sensitivity of the contact sensor 6 based on the change in the output value V (an abnormality determining step).

Figure 5:
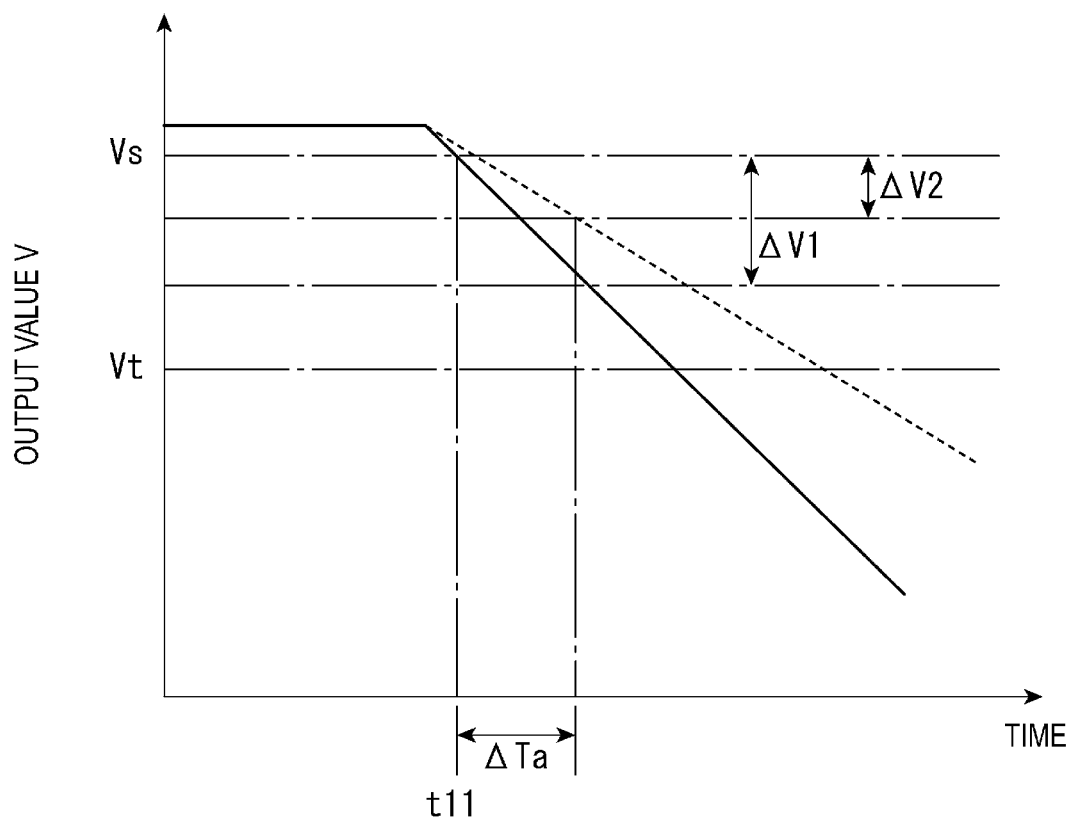
FIG. 5 is a graph showing the change in the detection signal outputted from the contact sensor according to the exemplary embodiment and illustrating an example of a method of determining an abnormality of sensitivity of the contact sensor.

Specifically, as shown in FIG. 5, the abnormality determining unit 75: calculates a change amount $\Delta V$ of the output value V for a predetermined time $\Delta Ta$ at or after t11 when the output value V of the detection signal Sd2 reaches a change initiation determination value Vs; and compares this change amount $\Delta V$ with a predetermined threshold $\Delta Vth$.

Here, the change initiation determination value Vs is a value for detecting that the contact tip 52A has initiated to contact with the workpiece W, and thus only needs to be determined as a value distinguishable from the output value V obtained when the contact tip 52A is in a non-contact state with the workpiece W.

Furthermore, the threshold $\Delta Vth$ is preferably determined depending on a movement speed of the probe 5 (relative movement speed of the contact tip 52A) in the contact step. Specifically, when the sensitivity of the contact sensor 6 is normal, the threshold $\Delta Vth$ can be determined as a lower limit of a tolerable range of the change amount $\Delta V$ based on the change amount $\Delta V$ of the detection signal Sd2 obtained by moving the probe 5 at a set speed for the predetermined time $\Delta Ta$.

In addition, in FIG. 5, the predetermined time $\Delta Ta$ is shown to have a broad width for description. However, the predetermined time $\Delta Ta$ is preferably a minimum unit time from which the change amount $\Delta V$ can be calculated.

When the calculated change amount $\Delta V$ is greater than or equal to the threshold $\Delta Vth$ (see a solid line in FIG. 5), the abnormality determining unit 75 determines that the sensitivity of the contact sensor 6 is normal and continues to monitor the change in the output value V of the detection signal Sd2.

On the other hand, when the change amount $\Delta V$ is smaller than the threshold $\Delta Vth$ (see a dotted line in FIG. 5), the abnormality determining unit 75 determines that the sensitivity of the contact sensor 6 is abnormal and outputs an abnormality determination signal to the movement controlling unit 71.

When the abnormality determination signal is inputted from the abnormality determining unit 75, the movement controlling unit 71 stops the operation of the movement mechanism 4 to interrupt the contact step. Accordingly, the contact tip 52A is prevented from being excessively strongly pressed against the workpiece W.

Moreover, the abnormality determining unit 75 may output the abnormality determination signal to the control device 9. When the abnormality determination signal is inputted from the abnormality determining unit 75, the control device 9 can display an alarm on a display or the like to notify an operator of the abnormality.

Effect(s) of Exemplary Embodiment

As described above, in the form measuring instrument 1 according to the exemplary embodiment, the abnormality determining unit 75 can determine the abnormality of the sensitivity of the contact sensor 6 by monitoring the change in the detection signal Sd2 outputted from the contact sensor 6 during the operation of the movement mechanism 4 and comparing this change with the change for the normal sensitivity.

Accordingly, the form measuring instrument 1 according to the exemplary embodiment of the invention can detect the abnormality of the sensitivity of the contact sensor 6 before the contact tip 52A or the contact sensor 6 is damaged.

Furthermore, when the change amount $\Delta V$ of the detection signal Sd2 for the predetermined time $\Delta Ta$ is smaller than the threshold $\Delta Vth$, the abnormality determining unit 75 according to the exemplary embodiment determines that the sensitivity of the contact sensor 6 is abnormal. Accordingly, the abnormality of the sensitivity of the contact sensor 6 can be suitably detected.

In addition, in the form measuring instrument 1 according to the exemplary embodiment, the abnormality determining unit 75 determines the abnormality using the threshold $\Delta Vth$ suitable for the movement speed of the probe 5 in the contact step and thus can more accurately detect the abnormality of the sensitivity of the contact sensor 6.

Moreover, in the form measuring instrument 1 according to the exemplary embodiment, when the abnormality determining unit 75 determines that the sensitivity of the contact sensor 6 is abnormal, the movement controlling unit 71 stops the operation of the movement mechanism 4. Accordingly, the contact tip 52A can be prevented from strongly contacting with the workpiece W during measuring the workpiece W. As a result, the contact tip 52A and the contact sensor 6 can be prevented from being damaged.

In particular, since the contact sensor 6 according to the exemplary embodiment is a vibrating sensor, the sensitivity of the contact sensor 6 may decrease due to a reduction in a degree of attenuation of the vibration of the stylus 52 more than originally intended, the reduction being caused by properties and state of a surface of the workpiece W and attachment of dust to the surface of the workpiece W. The form measuring instrument 1 according to the exemplary embodiment also can suitably detect such an abnormality of the sensitivity of the contact sensor 6.

Modification(s)

The scope of the invention is not limited to the above exemplary embodiment, and modifications, improvements, etc. are included within the scope of the invention as long as they are compatible with an object of the invention.

For instance, the movement of the probe 5 is controlled in the above exemplary embodiment, but movement of the stage 3 on which the workpiece W is placed may be controlled.

Furthermore, the abnormality determining unit 75 uses the change amount $\Delta V$ of the detection signal Sd2 for the predetermined time $\Delta Ta$ as an index for monitoring the change in the detection signal Sd2 in the above exemplary embodiment, but other indexes may be used.

Figure 6:
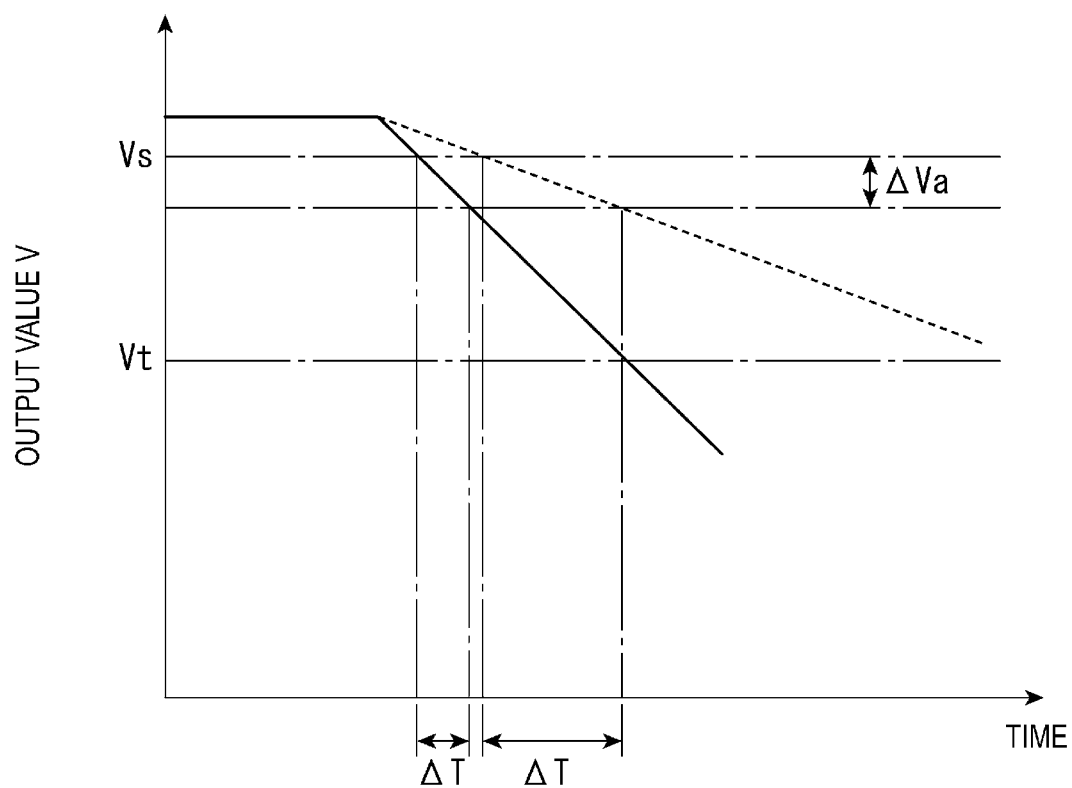
FIG. 6 is a graph showing the change in the detection signal outputted from the contact sensor according to the exemplary embodiment and illustrating another example of the method of determining an abnormality of sensitivity of the contact sensor.

For instance, as shown in FIG. 6, the abnormality determining unit 75 may monitor the change in the detection signal Sd2 using a required time $\Delta T$ for the predetermined change amount $\Delta Va$ of the detection signal Sd2 at or after a time when the detection signal Sd2 reaches the change initiation determination value Vs. In this case, when the required time $\Delta T$ is larger than a predetermined threshold $\Delta Tth$, the abnormality determining unit 75 can determine that the sensitivity of the contact sensor 6 is abnormal.

It should be noted that similarly to FIG. 5, in FIG. 6, a solid line shows the change in the detection signal Sd2 when the sensitivity of the contact sensor 6 is normal, and a dotted line shows the change in the detection signal Sd2 when the sensitivity of the contact sensor 6 is abnormal.

In addition, the threshold $\Delta Tth$ is preferably a value determined depending on the movement speed of the probe 5 similarly to the above exemplary embodiment.

The contact sensor according to the invention is not limited to a vibrating contact sensor as described in the above exemplary embodiment. In other words, the contact sensor according to the invention may be any sensor that detects a physical quantity representing a degree of contact of the contact tip with an object to be measured, such as a pressed amount against the object to be measured and a stress applied to the contact tip, as a contact amount of the contact tip 52A with the workpiece W.

For instance, the contact sensor 6 may detect the pressed amount of the contact tip 52A against the workpiece W based on a displacement amount of the stylus 52 with respect to the probe body 51 in the above exemplary embodiment. Moreover, the contact sensor 6 may detect the stress applied to the contact tip 52A based on a deformation amount of the stylus 52.

An abnormality determining process in the touch measurement of the workpiece W is described in the above exemplary embodiment, but the above abnormality determining process also can be performed in scanning measurement of the workpiece W.

For instance, when the form measuring instrument 1 according to the exemplary embodiment performs the scanning measurement of the workpiece W, the movement controlling unit 71 controls the operation of the movement mechanism 4 such that the output value V of the detection signal Sd2 from the contact sensor 6 remains at the target value Vt, whereby the contact tip 52A scans the workpiece W at a constant measuring force. Here, when the contact tip 52A initiates to contact with the workpiece W, the movement controlling unit 71 moves the probe 5 toward the workpiece W until the output value V of the detection signal Sd2 outputted from the contact sensor 6 reaches the target value Vt. In this operation, the abnormality determining unit 75 can determine the abnormality of the sensitivity of the contact sensor 6 by monitoring the change in the output value V of the detection signal Sd2 similarly to the above exemplary embodiment.

The structure of the coordinate measuring machine in a form of the form measuring instrument 1 is described in the above exemplary embodiment, but the invention is not limited to the coordinate measuring machine and can be applied to various form measuring instruments for which a contact sensor is used.

What is claimed is:

1. A form measuring instrument comprising:
   a contact tip configured to contact with an object to be measured;
   a movement mechanism configured to cause relative movement of the contact tip with respect to the object to be measured;
   a movement controlling unit configured to control the movement mechanism;
   a contact sensor configured to detect a contact amount of the contact tip with the object to be measured and output a detection signal corresponding to the contact amount; and
   an abnormality determining unit configured to determine an abnormality of sensitivity of the contact sensor based on a change in the detection signal outputted from the contact sensor during an operation of the movement mechanism in which the contact tip is pressed against the object to be measured.

2. The form measuring instrument according to claim 1, wherein the abnormality determining unit compares a change amount of the detection signal for a predetermined time with a predetermined threshold to determine the abnormality of the sensitivity of the contact sensor.

3. The form measuring instrument according to claim 1, wherein the abnormality determining unit compares a required time for a predetermined change amount of the detection signal with a predetermined threshold to determine the abnormality of the sensitivity of the contact sensor.

4. The form measuring instrument according to claim 2, wherein the abnormality determining unit uses the threshold that is different depending on a relative movement speed of the contact tip being pressed against the object to be measured.

5. The form measuring instrument according to claim 1, wherein the movement controlling unit stops the operation of the movement mechanism in response to a determination by the abnormality determining unit that the sensitivity of the contact sensor is abnormal.

6. A method of detecting an abnormality in a form measuring instrument comprising a contact tip configured to contact with an object to be measured, and a contact sensor configured to detect a contact amount of the contact tip with the object to be measured and output a detection signal corresponding to the contact amount, the method comprising:
   contacting by pressing the contact tip against the object to be measured; and
   determining the abnormality of sensitivity of the contact sensor based on a change in the detection signal outputted from the contact sensor during the contacting.

* * * * *